Sept. 24, 1940. T. ROBINSON 2,215,976
MIXING APPARATUS AND METHOD OF MIXING
Filed Nov. 12, 1938 2 Sheets-Sheet 1
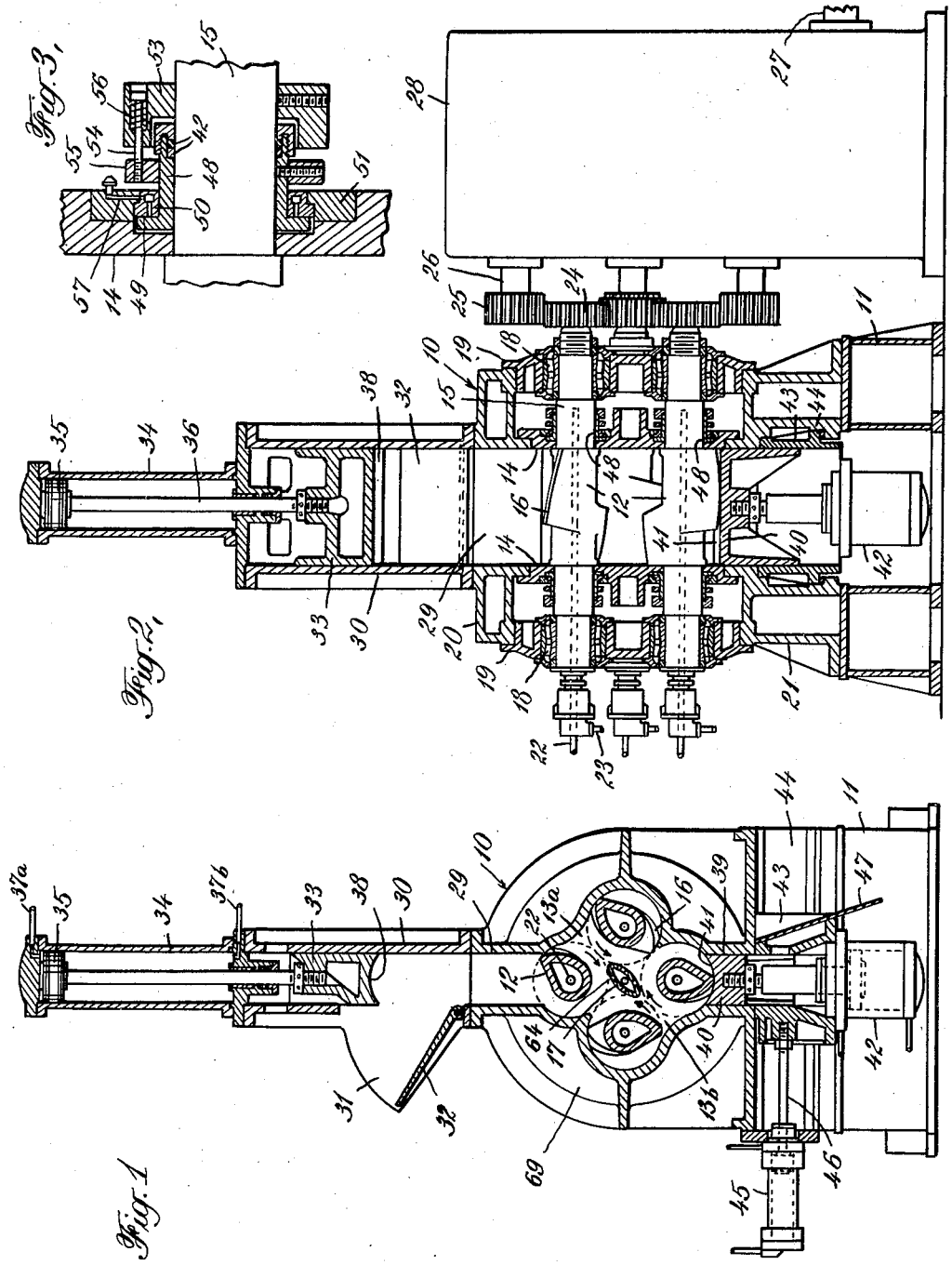

Sept. 24, 1940.    T. ROBINSON    2,215,976
MIXING APPARATUS AND METHOD OF MIXING
Filed Nov. 12, 1938    2 Sheets-Sheet 2
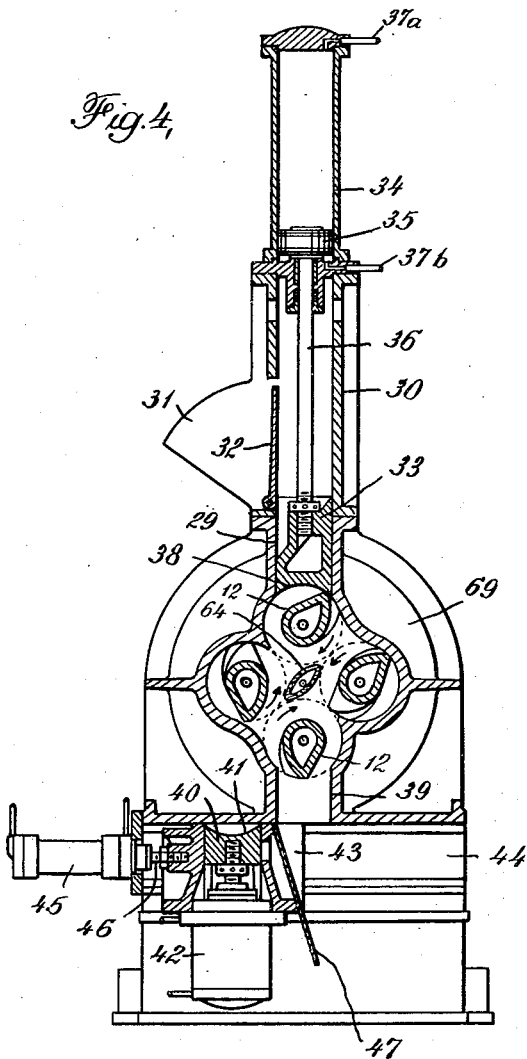
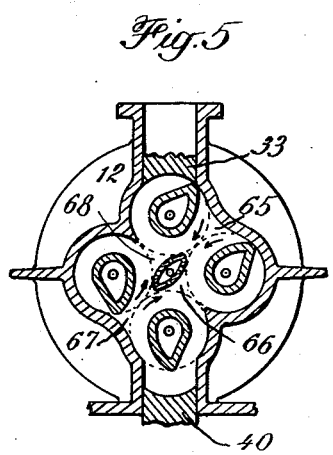
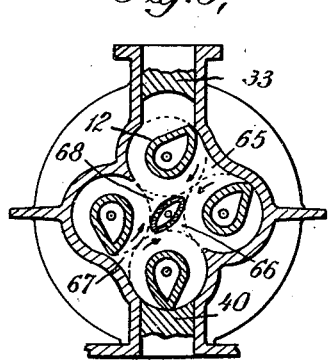
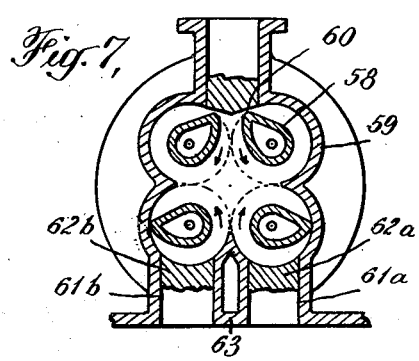
INVENTOR
Thomas Robinson
BY
ATTORNEYS Patented Sept. 24, 1940

2,215,976

UNITED STATES PATENT OFFICE 2,215,976

MIXING APPARATUS AND METHOD OF MIXING

Thomas Robinson, Smithtown, N. Y.

Application November 12, 1938, Serial No. 239,998

9 Claims. (Cl. 18—2)

This invention relates to mixing apparatus used for the production of plastic and similar mixes, such, for example, as rubber compounds, bituminous plastics containing fillers, paints, etc. and also for grinding and disintegrating purposes. More particularly, the invention is concerned with a mixer of the internal type which includes numerous novel features making the mixer superior in construction, performance, and scope of use to existing mixers employed for the same general purposes.

The mixer of the invention includes a plurality of connected chambers, even in number and including at least four, and within each chamber is a rotor which is pear-like in section and mounted for rotation in such manner that its tip moves along a wall of its chamber through a portion of each revolution. The material to be treated is introduced into the chambers through a passage containing a ram and the treated material is discharged through a similar passage which also contains a ram. The rams are movable by hydraulic means and their positions in the passages determine the volume occupied by the material undergoing treatment. Accordingly, the mixer is capable of operation on batches of different size and by manipulation of the rams, pressure may be maintained on the material during the mixing operation. The rotors are relatively small in size and may be heated or cooled by a suitable medium so that temperature conditions within the mixing chamber may be controlled, as desired. Preferably the rotors are driven at different speeds and this prevents the development of severe peak loads on the driving motor. In addition, the use of at least four rotors provides a like number of regions where the most effective mixing is produced by adjacent rotors approaching one another, and this results in an increase in efficiency with consequent decrease in mixing time. The new mixer includes a novel discharge mechanism which permits the mixed product to be discharged rapidly and contains numerous other novel features which will be made clear in the detailed description to follow when read in connection with the accompanying drawings.

In the drawings,

Fig. 1 is a view in vertical section of the new mixer;

Fig. 2 is a similar sectional view taken at right angles to Fig. 1, certain parts having been removed;

Fig. 3 is a sectional view showing a seal for a rotor shaft;

Fig. 4 is a view similar to Fig. 1 illustrating the use of the discharge mechanism;

Figs. 5 and 6 are fragmentary sectional views similar to Fig. 1, showing the parts in different positions during operation; and Fig. 7 is a diagrammatic sectional view showing a modified construction.

Referring to the drawings, the machine in the form illustrated in Fig. 1 includes a housing 10 which may be a casting of heavy construction and is mounted on a suitable base 11. This housing provides an enclosed working space within which operates a plurality of rotors 12, and the space may be considered to be subdivided into parallel cylindrical working chambers, so spaced that the boundary of each cylinder touches those of at least two adjacent cylinders. There is an even number of such chambers and at least four, and the curved outer walls of the working space follow the external boundaries of the cylindrical chambers between the points of contact of adjacent cylindrical spaces, except for feed and discharge passages to be described, and also at the places where adjacent rotors are approaching and moving inwardly away from the walls, additional working spaces are provided as at 13a, 13b.

The ends of the chambers are closed by plates 14 through which extend shafts 15 having the form within the chambers of rotors. The rotors are of generally conventional construction and are hollow and pear-like in section. The rotors include longitudinal blades 16 of helical form, the blades starting at opposite ends of the rotor and running for only part of the total length, but with the ends overlapping at the middle of each rotor. The helices of the blades at opposite ends of each rotor are of opposite hand and this insures good circulation of the materials being mixed. If desired, a hollow partition member 17 may be mounted so as to lie in the central space within the series of cylindrical chambers, the partition being oval in section so as to provide additional spaces for material at points where adjacent rotors are moving outwardly away from the member.

The rotor shafts are supported beyond the plates 14 in suitable bearings 18 in end frames 19 which may conveniently be mounted between upper and lower extensions 20, 21 of the housing casting. As illustrated, the bearings are of the double roller thrust and radial type and may be of standard construction. Each rotor shaft is hollow so that the rotor may be heated or cooled during operation, and the medium employed is introduced into the rotor through a pipe 22 and withdrawn through a pipe 23, this construction being well known. The rotor shafts are preferably driven at different relative speeds and the driving force may be applied through gears 24, one on each shaft, meshing with pinions 25 on drive shafts 26 supplied with power through a main drive shaft 27 and interposed gearing in a housing 28. If desired, the rotor shafts may be connected through flexible couplings to shafts mounted in the gear housing, both driving arrangements being of a commonly used type.

The housing 10 is provided at its top with a hollow neck 29 forming a feed passage leading to the rotor chambers, and mounted upon the upper end of the neck is a casing 30 formed with a feed chute 31 leading to the passage 29, the chute containing a door 32 which may be swung to close the entrance to the passage. A ram 33 is movable within the casing 30 by means of a hydraulic cylinder 34 containing a piston 35 connected by a rod 36 to the ram and fluid may be introduced through pipes 37a, 37b into the cylinder above and below the piston to move the ram up or down. In its downward movement, the ram may enter the passage 29, and the lower face 38 of the ram is concave so that when the ram is in the lowermost position, its lower surface forms a portion of the curved wall of the chamber along which move the edges of the blades of the top rotor.

Leading from the bottom chamber of housing 10 is a discharge passage 39 within which is a ram 40 having a concave upper face 41, this ram being operable by a hydraulic cylinder and piston combination 42. The cylinder is mounted on a carriage 43 slidable in guideways 44 in the lower portion of the housing casting and the carriage may be moved by a hydraulic cylinder and piston 45 secured to the housing casting at the end of the guideways with the piston rod 46 extending inward between the guideways. Secured to the side of the carriage away from the piston rod is a sloping discharge plate 47 which extends from the top of the carriage to a point below it. When the machine is in operation, the ram 40 is in elevated position within the passage 39 and it may be so disposed that its upper face forms a continuation of the adjacent curved walls of the mixing chamber. When the mixed material is to be discharged, the ram is lowered out of the passage 39 and the carriage 43 is moved by the cylinder 45 to the position shown in Fig. 4 in which the top of the carriage is clear of the discharge passage and the material issuing therefrom may pass down the discharge plate 47.

In a mixer of this type, it is desirable that the batch be closely confined during the mixing operation to obtain the greatest effect of the rotors. In the new machine, the faces of the rams form portions of the confining walls of the chambers and, since the rams are movable in the passages and these passages are of substantial length, the chambers have a variable capacity and it is, therefore, not necessary that the batch to be treated be accurately measured. Also, in some cases, it is desirable to subject certain of the ingredients of a combination to a preliminary mixing, after which the remainder is introduced and the mixing continued. With the machine disclosed, such operations are readily carried on, the preliminary mixing being performed with the rams in their inmost position in the passages, after which the remaining ingredients may be introduced through the feed passage and the rams may be positioned as may be required to provide the additional volume necessary for the addition to the batch. In both operations, the mixing chambers are kept filled with material so that efficient mixing can be carried on.

The use of the two rams also makes it possible to mix under high pressure and to maintain a uniform pressure, even though changes in the density of the material occur during the mixing operation. The rams fit tightly in the passages and it is, therefore, possible to process materials in the presence of water at temperatures in excess of the boiling point of water.

Since the material being treated is normally maintained under substantial pressure, seals are provided where the rotor shafts pass through the plates 14 to prevent the escape of material. These seals may be of any suitable construction and one seal adapted for the purpose is illustrated in Fig. 3. This device includes a sealing sleeve 48 rotating with the shaft 15 and having a circumferential flange 49 formed with a ground face bearing against the similar face of a ring 50. Ring 50 is renewable and is secured to the plate 14 by a ring 51 seated in a channel in the plate and having a flange overhanging the outer edge of the ring 50. The sleeve 48 has a sliding fit on the shaft and it is provided with a gland and stuffing box, generally designated 52, which prevents leakage along the shaft. As the packing used in the stuffing box rotates with the shaft, there is no wear on the packing and replacement is required only at long intervals. Fast on the shaft is a collar 53 which has bores in which are seated bolts 54 threaded into a driving ring 55 secured to the sleeve 48. Springs 56 beneath the heads of the bolts tend to force them outwardly and thus maintain the ground face of the flange on sleeve 48 in contact with the similar face of the stationary seal ring 50. Passages 57 through the rings 50 and 51 permit the introduction of lubricant under pressure feed. When the machine is in operation, any material escaping under pressure through the plate 14 around a shaft 15 tends to force the sleeve 48 outward and thus increase the pressure between the ground faces constituting the seal.

In the modified mixer construction shown in Fig. 7, the rotors 58 are arranged in pairs in upper and lower rows in a housing 59 and because of the arrangement, the lower face of the feed ram 60 is convex instead of concave in order that the face may provide continuations of the adjacent curved surfaces of the walls of the top mixing chamber. This arrangement of the rotors requires the provision of two discharge passages 61a, 61b, each with its ram 62a, 62b, and between the passages is a partition member 63 having its upper end pointed in section to provide curved surfaces along which the tips of the two lower rotors may sweep.

In the operation of the mixer, the discharge ram is raised so that it lies at the top of the discharge neck in the position shown in Fig. 1 and the feed neck ram is then raised to permit the material which is to be processed to be fed into the feed neck through the feed chute and forced into the working space by the feed neck ram. The batch to be treated is of such size that it will completely fill the working space and any excess material will lie within the feed neck against the face of the feed neck ram.

The rotors are then started and in their operation, the advancing faces of their blades rub and smear material against and along the chamber walls and at the same time, the pairs of adjacent blades force the material inwardly toward the middle of the working space. The material then flows back along the rear faces of the blades and a circulation of material is thus set up. The direction and speed of movement of the material is constantly changing and an interchange of material from one rotor to another occurs at the banks between the rotors, because of the constantly varying relative positions of the rotor blades. The movement of the material within the space is consequently of a highly turbulent nature and there is a thorough and repeated quartering of the material which results in complete mixing. The high pressure under which the material is maintained during mixing creates frictional resistance in the mass and this and the constantly changing flow result in distortion of the particles of such material as rubber.

When the batch is of such size that excess material lies in the feed neck, the pressure on the rams is regulated so that the material is forced down out of the feed neck into the working space and a similar quantity from the space is forced into the discharge neck. When this condition occurs, the pressure on the rams is changed to permit the discharge neck ram to rise and force the excess quantity of material into the working space, while an equivalent amount of material enters the feed neck. This cycle of operations is repeated until all of the batch is uniformly processed and the movement of the material out of one neck and into the other adds to the turbulence of flow in the working space and increases the efficiency of the mixing operation.

In some instances, the batch undergoing treatment may contain ingredients which require more processing than others, or in the mixing process, successive reactions between ingredients may take place. In carrying on such operations, the various ingredients may be fed at intervals and because of the variation in batch size permitted by the action of the feed and discharge rams, the working space may be kept full and proper pressure conditions maintained at all times. The use of the two rams also makes it possible to maintain required pressure conditions even though there may be variations in volume and specific gravity of the batch occurring because of the processing.

In some mixing operations, it may be necessary to add liquids to the batch and this can be done before the mixing starts or at any stage thereof by introducing the liquids through the central partition member 17, which is hollow and may be provided with outlet openings 64. In mixers from which the central partition is omitted, the liquid may be introduced through openings in the end plates 14.

When the mixing operation is completed, the discharge ram is withdrawn from the carriage and the latter is moved laterally to open the discharge neck and place the discharge plate 47 at one side thereof. The mixed material will then flow through the neck and along the plate into a suitable receptacle.

In internal mixers of the type described, the most effective mixing action takes place in those regions in the working space, referred to as banks, where the rotors are approaching one another. In existing machines of the two-rotor type, there is only one such region, but in the present machine containing four rotors, there are four of these regions, indicated at 65, 66, 67 and 68, Fig. 5. The mixing operation in the new machine is therefore much more efficient than in the prior apparatus.

A further advantage of the present machine is that for a given size of batch, the rotors are smaller and thus may be made lighter. This lowers the cost of construction and, in addition, better cooling or heating of the material undergoing treatment may be effected by the medium supplied to the rotors, not only because of the lighter construction, but also because of the more intimate contact of the rotors with the stock. In a two-rotor machine of the previous construction, the approach of the rotors results in a severe peak load upon the driving motor, but with the new machine having a larger number of smaller rotors and smaller banks of material in the regions where the rotors approach, the peak loads are much less severe and better distributed so that a substantial saving in power cost results.

The material undergoing treatment in the new mixer may be kept at the proper temperature by means of a heat transfer medium flowing through the interior of the rotors and through the central partition, if such a partition is used. In addition, the outer walls of the mixing chambers may also be employed for imparting heat to or withdrawing it from the batch. For this purpose, the walls may be jacketed in the ordinary way or they may be provided with fins 69 and the heat transfer medium sprayed upon the walls and fins.

In addition to the advantages above pointed out, the new machine is of such mixing efficiency that it has a high production rate and the improved discharged gate permits rapid discharge so that little operating time is lost in loading and discharging. A machine for a given production is, therefore, smaller than prior machines capable of the same production.

The mixing and disintegrating of material by intensive rotor action in the manner above described, which permits operating on a batch of greater bulk than the capacity of the working space in which the action takes place and involves confining the excess material in an extension from the space and forcing the excess alternately into and out of the space and an equivalent amount into and out of another extension, constitutes a novel method forming part of the invention. By this method, all portions of a batch greater in bulk than the capacity of the working space can be subjected to the intense mechanical rotor action, so that the entire batch is thoroughly treated, and following each period of intense working, a portion of the batch is given a rest interval in one of the extensions. In the processing of certain materials, this rest interval is highly desirable and intervals of varying duration may be readily provided in the practise of the new method.

I claim:

1. An apparatus for mixing and disintegrating purposes, which comprises a housing having walls defining an enclosed working space, a feed passage leading into the upper part of the housing, a discharge passage leading from the lower part of the housing, a plurality of horizontal rotors within the housing, a ram movable into and out of the upper passage, fluid pressure means for moving the ram, a carriage, a second ram mounted thereon and movable relative thereto into and out of the lower passage, fluid pressure means on the carriage for moving the second ram, and means for moving the carriage laterally to and from a position in which the second ram is offset from the end of its passage.

2. In a mixing and disintegrating apparatus, the combination of a housing having walls defining a working space, passages leading to and from the space for admission and discharge, respectively, of material, an even number of rotors totaling at least four within the space, the rotors defining cylinders of revolution, each of which is substantially in contact with two adjacent cylinders, and a partition member in the working space substantially filling the regions within the group of cylinders where the rotors move toward each other and inwardly toward the partition member.

3. In a mixing and disintegrating apparatus, the combination of a housing having walls defining a working space, passages leading to and from the space for admission and discharge, respectively, of material, an even number of rotors totaling at least four within the space, the rotors defining cylinders of revolution, each of which is substantially in contact with two adjacent cylinders, and a hollow partition member within the group of cylinders having openings for discharge of a fluid into the working space.

4. A mixing and disintegrating apparatus which comprises a housing having walls forming an enclosed working space, the walls having openings, passages leading to and from the openings for introduction and discharge, respectively, of material, closures for the passages, the passages and their closures forming closed extensions from the working space, means for displacing the closures within the passages towards and from said working space to vary the total capacity of the working space and extensions and to exert pressure on the material in the working space and extensions, and a plurality of rotors operable on the material within the working space.

5. A method of treating material which comprises confining a batch of material within a chamber including a working space, the batch being greater in bulk than the capacity of the working space, subjecting the material to intense rotor action while maintaing the material under substantial pressure, and moving the excess material into the working space at one region thereof and simultaneously withdrawing material from another region of the space during the rotor action, whereby all portions of the batch may be subjected to the rotor action.

6. A method of treating material which comprises confining a batch of material within a chamber including a working space, the batch being greater in bulk than the capacity of the working space, subjecting the material to intense rotor action while maintaining the material under substantial pressure, withdrawing material from the working space to provide space therein for the excess material and moving the excess material into the space to subject it to the rotor action, withdrawing material from the working space to provide space therein for the previously withdrawn material, and returning the previously withdrawn material into the working space to subject it to additional rotor action.

7. An apparatus for mixing and disintegrating purposes, which comprises an enclosed working space, rotor means within the space, a feed passage leading to the space, a discharge passage extending outwardly from the space, a ram movable in each passage lengthwise thereof towards and from said space for forcing material from the passages into the working space and for permitting withdrawal of material from said space, means for reciprocating the rams in the passages, and means including said last-named means for permitting discharge of material through said discharge passage.

8. An apparatus for mixing and disintegrating purposes, which comprises an enclosed working space, rotor means within said space, a feed passage leading to said space, a discharge passage extending outwardly from said space, a ram movable in each passage lengthwise thereof towards and from said working space for forcing material from the passages into the working space and for permitting withdrawal of material from the working space, means for reciprocating the rams in said passages, and means for moving the discharge passage ram transversely of said discharge passage into and out of a position in alignment with the outer end thereof to permit discharge of material through said discharge passage.

9. An apparatus for mixing and disintegrating purposes, which comprises a housing having walls defining a confined working space, rotor means within said space, passages extending outwardly from said space, means closing said passages, said means forming walls each movable within its passage towards and from said confined space to vary the size of the confined space, means for moving said walls in said passages towards and from said confined space, means for introducing material into said confined space, and means for leading material from said confined space.

THOMAS ROBINSON.